US011224020B2

(12) United States Patent
Choi et al.

(10) Patent No.: US 11,224,020 B2
(45) Date of Patent: Jan. 11, 2022

(54) UPLINK TRANSMISSION POWER CONTROL METHOD AND DEVICE IN WIRELESS CELLULAR COMMUNICATION SYSTEM

(71) Applicant: Samsung Electronics Co., Ltd., Gyeonggi-do (KR)

(72) Inventors: Seunghoon Choi, Gyeonggi-do (KR); Youngbum Kim, Seoul (KR); Younsun Kim, Gyeonggi-do (KR); Taehyoung Kim, Seoul (KR); Jeongho Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/596,254

(22) Filed: Oct. 8, 2019

(65) Prior Publication Data

US 2020/0037259 A1 Jan. 30, 2020

Related U.S. Application Data

(63) Continuation of application No. 16/603,673, filed as application No. PCT/KR2018/004752 on Apr. 24, 2018.

(30) Foreign Application Priority Data

May 2, 2017 (KR) .................. 10-2017-0056413

(51) Int. Cl.
*H04W 52/14* (2009.01)
*H04W 72/04* (2009.01)
*H04L 5/00* (2006.01)

(52) U.S. Cl.
CPC ......... *H04W 52/146* (2013.01); *H04L 5/0094* (2013.01); *H04W 72/0406* (2013.01); *H04W 72/0446* (2013.01)

(58) Field of Classification Search
CPC ... H04W 52/08; H04W 52/32; H04W 52/367; H04W 52/325; H04W 52/146;
(Continued)

(56) References Cited

U.S. PATENT DOCUMENTS

2006/0205396 A1 9/2006 Laroia et al.
2009/0196367 A1 8/2009 Kim et al.
(Continued)

FOREIGN PATENT DOCUMENTS

KR 1020090084769 8/2009
KR 100943895 2/2010
(Continued)

OTHER PUBLICATIONS

PCT/ISA/210 Search Report issued on PCT/KR2018/004752, pp. 6.
(Continued)

*Primary Examiner* — Lewis G West
(74) *Attorney, Agent, or Firm* — The Farrell Law Firm, P.C.

(57) ABSTRACT

Disclosed are a communication technique for merging, with IoT technology, a 5G communication system for supporting a data transmission rate higher than that of a 4G system; and system therefor. The present disclosure can be applied to intelligent services (for example, smart home, smart building, smart city, smart car or connected car, healthcare, digital education, retail, security, and safety-related services, and the like) on the basis of 5G communication technology and IoT-related technology. A power control method for uplink transmission in a wireless cellular communication system is disclosed.

16 Claims, 9 Drawing Sheets

(58) Field of Classification Search
CPC .......... H04W 72/0413; H04W 72/044; H04W 72/0446; H04W 72/0406; H04W 72/04; H04W 5/00; H04W 52/262; H04L 5/0094; H04L 5/0091; H04L 5/0007; H04L 5/0053

See application file for complete search history.

(56) References Cited

U.S. PATENT DOCUMENTS

| | | |
|---|---|---|
| 2009/0312008 A1 | 12/2009 | Lindoff et al. |
| 2011/0249578 A1 | 10/2011 | Nayeb Nazar et al. |
| 2011/0261774 A1 | 10/2011 | Lunttila et al. |
| 2012/0014320 A1 | 1/2012 | Nam et al. |
| 2013/0051355 A1* | 2/2013 | Hong .............. H04L 5/0094 370/329 |
| 2013/0223331 A1* | 8/2013 | Chun ............... H04W 72/04 370/315 |
| 2014/0126386 A1 | 5/2014 | Beale |
| 2014/0219210 A1* | 8/2014 | Lunttila .......... H04L 1/1858 370/329 |
| 2014/0369294 A1 | 12/2014 | Seo et al. |
| 2016/0183265 A1* | 6/2016 | Webb .............. H04W 52/367 370/329 |
| 2017/0034817 A1* | 2/2017 | Park ............... H04L 5/0035 |
| 2017/0325256 A1 | 11/2017 | Islam et al. |
| 2018/0084573 A1* | 3/2018 | Jiang .............. H04L 5/0053 |
| 2019/0052503 A1* | 2/2019 | Hayashi ........... H04W 76/27 |
| 2019/0068423 A1* | 2/2019 | Hwang ............. H04L 5/00 |
| 2019/0081832 A1* | 3/2019 | Marinier .......... H04L 5/0053 |
| 2019/0081841 A1* | 3/2019 | Kim ................ H04L 5/0053 |
| 2019/0116611 A1* | 4/2019 | Lee ................ H04W 72/1278 |
| 2019/0380096 A1* | 12/2019 | Zhang ............. H04W 52/146 |
| 2020/0044796 A1* | 2/2020 | Yang ................ H04L 5/0092 |
| 2020/0045651 A1 | 2/2020 | Cui et al. |
| 2020/0084762 A1* | 3/2020 | Gou ................ H04B 7/088 |

FOREIGN PATENT DOCUMENTS

| | | |
|---|---|---|
| KR | 1020110099727 | 9/2011 |
| KR | 1020120035817 | 4/2012 |
| KR | 1020140119700 | 10/2014 |
| WO | WO 2006/096887 | 9/2006 |
| WO | WO 2009/095369 | 8/2009 |

OTHER PUBLICATIONS

PCT/ISA/237 Written Opinion issued on PCT/KR2017/004752, pp. 5.

European Search Report dated Mar. 3, 2020 issued in counterpart application No. 18794329.5-1205, 6 pages.

U.S. Office Action dated Feb. 19, 2021 issued in counterpart U.S. Appl. No. 16/603,673, 11 pages.

U.S. Office Action dated Jun. 4, 2020 issued in counterpart U.S. Appl. No. 16/603,673, 14 pages.

Korean Office Action dated Jun. 22, 2021 issued in counterpart application No. 10-2017-0056413, 10 pages.

* cited by examiner

UPLINK TRANSMISSION POWER CONTROL METHOD AND DEVICE IN WIRELESS CELLULAR COMMUNICATION SYSTEM

PRIORITY

This application is a Continuation of U.S. patent application Ser. No. 16/603,673, filed with the U.S. Patent and Trademark Office on Oct. 8, 2019, which is a National Phase Entry of PCT International Application No. PCT/KR2018/004752, which was filed on Apr. 24, 2018, and claims priority to Korean Patent Application No. 10-2017-0056413, which was filed on May 2, 2017, the content of each of which is incorporated herein by reference.

BACKGROUND

1. Field

The disclosure relates to a method and an apparatus for controlling power of uplink transmission in a wireless cellular communication system.

2. Description of Related Art

In order to meet wireless data traffic demands, which have increased since to commercialization of a 4G communication system, efforts to develop an improved 5G communication system or a pre-5G communication system have been made. For this reason, the 5G communication system or the pre-5G communication system is called a beyond-4G-network communication system or a post-LTE system.

In order to achieve a high data transmission rate, implementation of the 5G communication system in an mmWave band (for example, a 60 GHz band) is being considered. In the 5G communication system, technologies such as beamforming, massive MIMO, full-dimensional MIMO (FD-MIMO), array antenna, analog beamforming, and large-scale antenna techniques are being discussed as means to mitigate a propagation path loss in the mmWave band and increase a propagation transmission distance.

Further, the 5G communication system has developed technologies such as an evolved small cell, an advanced small cell, a cloud radio access network (RAN), an ultra-dense network, device-to-device communication (D2D), a wireless backhaul, a moving network, cooperative communication, coordinated multi-points (CoMP), and received interference cancellation to improve the system network.

In addition, the 5G system has developed advanced coding modulation (ACM) schemes such as hybrid FSK and QAM modulation (FQAM) and sliding window superposition coding (SWSC), and advanced access technologies such as filter bank multi-carrier (FBMC), non-orthogonal multiple access (NOMA), and sparse code multiple access (SCMA).

Meanwhile, the Internet has evolved from a human-oriented connection network, in which humans generate and consume information, into the Internet of Things (IoT), in which distributed components such as objects exchange and process information. Internet-of-Everything (IoE) technology, in which big-data processing technology is combined with the IoT technology through a connection with a cloud server or the like, has emerged. In order to the implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet technology (IT) service to create new value in peoples' lives may be provided. The IoT may be applied to fields such as those of a smart home, a smart building, a smart city, a smart car, a connected car, a smart grid, health care, a smart home appliance, or high-tech medical services through the convergence of conventional information technology (IT) and various industries.

Accordingly, various attempts to apply the 5G communication to the IoT network are made. For example, 5G communication technologies such as a sensor network, machine-to-machine (M2M) communication, and machine-type communication (MTC) are implemented using beamforming, MIMO, and array-antenna schemes. The application of a cloud RAN as big-data processing technology may be an example of convergence of the 5G technology and the IoT technology.

According to the recent development of long-term evolution (LTE) and LTE-Advanced, a method and an apparatus for controlling power of uplink transmission in a wireless cellular communication system are required.

SUMMARY

The present disclosure has been made to address at least the disadvantages described above and to provide at least the advantages described below. The disclosure provides a method by which a terminal controls the power of uplink transmission within a maximum transmission power value of the terminal and an apparatus according thereto in order to maintain uplink coverage when a transmission interval of uplink transmission, such as an uplink data channel, an uplink control, or an uplink sounding reference signal, varies in units of OFDM symbols or in order to satisfy reliability in a service having ultra reliability as a requirement thereof.

In accordance with an aspect of the disclosure, a base station is provided for a physical uplink control channel (PUCCH) reception in a wireless communication system, with the base station including a transceiver configured to transmit and receive a signal; and a controller configured to transmit information associated with a subcarrier spacing, information associated with a number of symbols for a PUCCH, information associated with an uplink power control, and information associated with a physical downlink control channel (PDCCH), through system information; transmit a command for an uplink power control on the PDCCH; and receive the PUCCH, the PUCCH being transmitted by a power based on the number of symbols for the PUCCH and the command for the uplink power control.

In accordance with a further embodiment of the present disclosure, a method is provided for a physical uplink control channel (PUCCH) reception by a base station in a wireless communication system, the method including transmitting information associated with a subcarrier spacing, information associated with a number of symbols for a PUCCH, information associated with an uplink power control, and information associated with a physical downlink control channel (PDCCH), through system information; transmitting a command for an uplink power control on the PDCCH; and receiving the PUCCH, the PUCCH being transmitted by a power based on the number of symbols for the PUCCH and the command for the uplink power control.

In accordance with another aspect of the present disclosure, a terminal for a physical uplink control channel (PUCCH) transmission in a wireless communication system, the terminal including a transceiver configured to transmit and receive a signal; and a controller configured to acquire information associated with a subcarrier spacing, information associated with a number of symbols for a PUCCH, information associated with an uplink power control, and information associated with a physical downlink control channel (PDCCH), through system information; acquire a command for an uplink power control on the PDCCH; and transmit the PUCCH by a power based on the number of symbols for the PUCCH and the command for the uplink power control.

In accordance with a further aspect of the present disclosure, a method for a physical uplink control channel (PUCCH) transmission by a terminal in a wireless communication system is provided, the method including acquiring information associated with a subcarrier spacing, information associated with a number of symbols for a PUCCH, information associated with an uplink power control, and information associated with a physical downlink control channel (PDCCH), through system information; acquiring a command for an uplink power control on the PDCCH; and transmitting the PUCCH by a power based on the number of symbols for the PUCCH and the command for the uplink power control.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
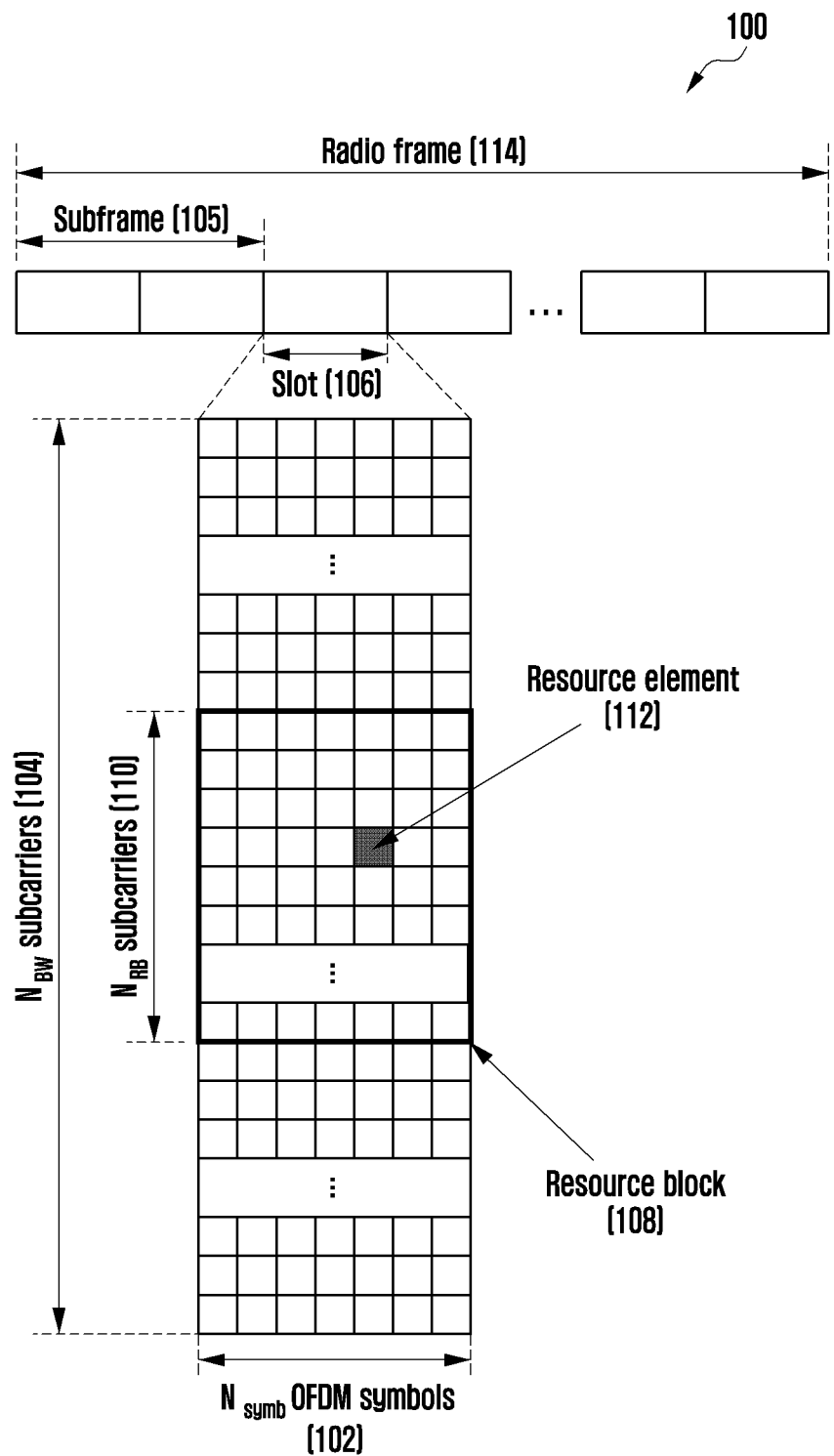
FIG. 1 illustrates the basic structure of time-frequency regions in the LTE system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Hereinafter, an embodiment of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Further, the detailed description of embodiments of the disclosure is made mainly based on a wireless communication system based on OFDM, particularly 3GPP EUTRA standard, but the subject matter of the disclosure can be applied to other communication systems having a similar technical background and channel form after a little modification without departing from the scope of the disclosure and the above can be determined by those skilled in the art.

Meanwhile, research on the coexistence of new 5G communication (also referred to as "new radio (NR) communication" in the disclosure) and the conventional LTE communication in the same spectrum is being conducted for implementation in a mobile communication system.

The disclosure relates to a wireless communication system, and more particularly to a method and an apparatus in which a terminal capable of transmitting and receiving data in at least one of different communication systems existing in one carrier frequency or a plurality of carrier frequencies transmits and receives data to and from each of the communication systems.

In general, a mobile communication system is developed to provide voice services while guaranteeing the mobility of users. However, the mobile communication system has gradually expanded its service scope from voice to data services. In recent years, the mobile communication system has evolved to a degree such that it is capable of providing high-speed data services. However, since resources are lacking and users demand higher speed services in the mobile communication system currently providing service, a further improved mobile communication system is needed.

To meet the demands, standardization of long-term evolution (LTE) is progressed by the $3^{rd}$-generation partnership project (3GPP), as one of the next-generation mobile communication systems that are being developed. LTE is technology of implementing high-speed packet-based communication with a maximum transmission rate of 100 Mbps. To this end, several methods are under discussion, including a method of reducing the number of nodes located on a communication channel by simplifying a network architecture, a method of making wireless protocols as close as possible to a wireless channel, and the like.

When decoding fails upon initial transmission, the LTE system employs a hybrid automatic repeat request (HARQ) scheme of retransmitting the corresponding data in a physical layer. In the HARQ scheme, when a receiver does not accurately decode data, the receiver transmits information (negative acknowledgement: NACK) informing a transmitter of decoding failure, and thus the transmitter may retransmit the corresponding data on the physical layer. The receiver combines the data, which the transmitter retransmits, with the data the decoding of which failed, thereby increasing data reception performance. Also, when the receiver accurately decodes data, the receiver transmits information (ACK) reporting that decoding is successful, so that the transmitter may transmit new data.

FIG. 1 illustrates the basic structure of time-frequency regions, which are radio resource regions in which data or a control channel is transmitted in a downlink of an LTE system.

In FIG. 1, the horizontal axis indicates a time region and the vertical axis indicates a frequency region. In the time region, the minimum transmission unit is an OFDM symbol. One slot 106 consists of $N_{symb}$ OFDM symbols 102, and one subframe 105 consists of two slots. The length of one slot is 0.5 ms, and the length of one subframe is 1.0 ms. A radio frame 114 is a time region unit consisting of 10 subframes. The minimum transmission unit in the frequency region is a subcarrier, and the entire system transmission bandwidth consists of a total of $N_{BW}$ subcarriers 104.

In the time-frequency regions, the basic resource unit is a resource element (RE) 112, and an RE is expressed by an OFDM symbol index and a subcarrier index. A resource block (RB) (or physical resource block (PRB) 108 is defined by $N_{symb}$ consecutive OFDM symbols 102 in the time region and $N_{RB}$ consecutive subcarriers 110 in the frequency region. Accordingly, one RB 108 consists of $N_{symb} \times N_{RB}$ REs 112. In general, the minimum transmission unit of data is an RB. In the LTE system, generally, $N_{symb}=7$ and $N_{RB}=12$. $N_{BW}$ and $N_{RB}$ are proportional to the bandwidth of a system transmission band. The data rate increases in proportion to the number of RBs scheduled for the terminal. The LTE system defines and operates 6 transmission bandwidths. In the case of a frequency division duplex (FDD) system, in which the downlink and the uplink are divided according to frequency, a downlink transmission bandwidth and an uplink transmission bandwidth may be different from each other. A channel bandwidth refers to a radio-frequency (RF) bandwidth, corresponding to the system transmission bandwidth. [Table 1] indicates the relationship between a system transmission bandwidth and a channel bandwidth defined in the LTE system. For example, if the LTE system has a channel bandwidth of 10 MHz, the transmission bandwidth consists of 50 RBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration | 6 | 15 | 25 | 50 | 75 | 100 |

Downlink control information is transmitted within N initial OFDM symbols within the subframe. Generally, N={1, 2, 3}. Therefore, the value of N may be changed for each subframe on the basis of the amount of control information to be transmitted in the current subframe. The control information may include a control channel transmission interval indicator indicating the number of OFDM symbols via which control information is to be transmitted, scheduling information associated with downlink data or uplink data, a HARQ ACK/NACK signal, or the like.

In the LTE system, scheduling information associated with downlink data or uplink data may be transmitted from a base station to the terminal via downlink control information (DCI). The uplink (UL) is a radio link through which the terminal transmits data or control signals to the base station, and the downlink (DL) is a radio link through which the base station transmits data or control signals to the terminal. The DCI is defined in various formats. A DCI format may be determined and applied for operation based on whether scheduling information is for uplink data (UL grant) or for downlink data (DL grant), whether the DCI is compact DCI of which the control information is small, whether spatial multiplexing using multiple antennas is applied, whether the DCI is used for controlling power, and the like. For example, DCI format 1, corresponding to scheduling control information of downlink data (DL grant), may be configured to include at least the following control information.

Resource allocation type 0/1 flag: indicates whether a resource allocation type is type 0 or type 1. Type 0 applies a bitmap scheme and allocates resources in units of resource block groups (RBGs). In the LTE system, a basic scheduling unit is a resource block (RB), expressed by time and frequency region resources, and an RBG consists of a plurality of RBs and is used as a basic scheduling unit in the type 0 scheme. Type 1 allows allocation of a predetermined RB in an RBG.

Resource block assignment: indicates RBs allocated to data transmission. Indicated resources are determined according to the system bandwidth and resource allocation scheme.

Modulation and coding scheme (MCS): indicates the modulation scheme used for data transmission and the size of a transport block, which is the data to be transmitted.

HARQ process number: indicates a process number of HARQ.

New data indicator: indicates HARQ initial transmission or HARQ retransmission.

Redundancy version: indicates the redundancy version of HARQ.

Transmit power control (TPC) command for physical uplink control channel (PUCCH): indicates a transmission power control command for a PUCCH, which is an uplink control channel.

The DCI is transmitted through a physical downlink control channel (PDCCH) or an enhanced PDCCH (EPDCCH), which is a downlink physical control channel, via a channel-coding and modulation process.

In general, the DCI is channel-coded independently for each terminal, and is then configured and transmitted as an independent PDCCH. In the time region, a PDCCH is mapped and transmitted during the control channel transmission interval. The frequency region mapping position of a PDCCH is determined by an identifier (ID) of each terminal, and is propagated to the entire system transmission band.

Downlink data is transmitted through a physical downlink shared channel (PDSCH), which is a physical downlink data channel. The PDSCH is transmitted after the control channel transmission interval, and the detailed mapping location in the frequency region and scheduling information such as the modulation scheme are indicated through DCI transmitted through the PDCCH.

Via an MCS including 5 bits in the control information included in the DCI, the base station may report the modulation scheme applied to a PDSCH to be transmitted to the terminal and the size (transport block size (TBS)) of data to be transmitted. The TBS corresponds to the size before channel coding for error correction is applied to the data (TB) to be transmitted by the BS.

The modulation scheme supported by the LTE system includes Quadrature Phase Shift Keying (QPSK), 16 Quadrature Amplitude Modulation (16QAM), and 64QAM. Modulation orders (Qm) correspond to 2, 4, and 6 respectively. That is, in the case of QPSK modulation, 2 bits are transmitted per symbol. In the case of 16QAM modulation, 4 bits are transmitted per symbol. In the case of 64QAM modulation, 6 bits are transmitted per symbol.

Unlike LTE Rel-8, 3GPP LTE Rel-10 has adopted a bandwidth extension technology in order to support a larger amount of data transmission. The technology called bandwidth extension or carrier aggregation (CA) may expand the band and thus increase the amount of data capable of being transmitted through the expanded band compared to the LTE Rel-8 terminal, which transmits data in one band. Each of the bands is called a component carrier (CC), and the LTE Rel-8 terminal is defined to have one component carrier for each of the downlink and the uplink. Further, a group of uplink component carriers connected to downlink component carriers through SIB-2 is called a cell. The SIB-2 connection relationship between the downlink component carrier and the uplink component carrier is transmitted through a system signal or a higher-layer signal. The UE supporting CA may receive downlink data through a plurality of serving cells and transmit uplink data.

In LTE Rel-10, when the base station has difficulty in transmitting a physical downlink control channel (PDCCH) to a particular terminal in a particular serving cell, the base station may transmit the PDCCH in another serving cell and configure a carrier indicator field (CIF) as a field indicating that the corresponding PDCCH is a physical downlink shared channel (PDSCH) or a physical uplink shared channel (PUSCH) of the other serving cell. The CIF may be configured in the terminal supporting CA. The CIF is determined to indicate another serving cell by adding 3 bits to the PDCCH in a particular serving cell, and the CIF is included only when cross-carrier scheduling is performed, and if CIF is not included, cross-carrier scheduling is not performed. When the CIF is included in downlink allocation information (DL assignment), the CIF is defined to indicate a serving cell to which a PDSCH scheduled by the DL assignment is transmitted. When the CIF is included in uplink resource allocation information (UL grant), the CIF is defined to indicate a serving cell to which a PUSCH scheduled by the UL grant is transmitted.

As described above, carrier aggregation (CA), which is a bandwidth expansion technology, is defined in LTE-10, and thus a plurality of serving cells may be configured in the terminal. The UE periodically or aperiodically transmits channel information of the plurality of serving cells to the base station for data scheduling of the base station. The base station schedules and transmits data for each carrier, and the terminal transmits A/N feedback of data transmitted for each carrier. LTE Rel-10 is designed to transmit a maximum of 21 bits of A/N feedback, and is designed to transmit A/N feedback and to discard the channel information when transmission of A/N feedback and transmission of channel information overlap in one subframe. LTE Rel-11 is designed to multiplex A/N feedback and channel information of one cell and transmit the A/N feedback corresponding to a maximum of 22 bits and the channel information of one cell in transmission resources of PUCCH format 3 through PUCCH format 3.

A scenario in which a maximum of 32 serving cells is configured is assumed in LTE-13, and the concept of expanding the number of serving cells up to a maximum of 32 serving cells using not only a licensed band but also an unlicensed band has been devised. Further, LTE Rel-13 provides an LTE service in an unlicensed band such as a band of 5 GHz in consideration of limitation on the number of licensed bands, such as the LTE frequency, which is called licensed assisted access (LAA). Carrier aggregation technology of LTE is applied to LAA to support an LTE cell, which is a licensed band, as a P cell and an LAA cell, which is an unlicensed band, as an S cell. Accordingly, as in LTE, feedback generated in the LAA cell corresponding to the SCell should be transmitted only in the PCell, and the LAA cell may freely apply a downlink subframe and an uplink subframe. Unless specially mentioned in this specification, "LTE" refers to all technologies evolved from LTE, such as LTE-A and LAA.

Meanwhile, as a post-LTE communication system, a $5^{th}$-generation wireless cellular communication system (hereinafter, referred to as "5G" or "NR" in the specification) should freely reflect the various requirements of users and service providers, so that services that meet various requirements should be supported.

Accordingly, 5G may define various 5G services such as enhanced mobile broadband communication (hereinafter, referred to as eMBB in this specification), massive machine-type communication (hereinafter, referred to as mMTC in this specification), and ultra-reliable and low-latency communications (hereinafter, referred to as URLLC in this specification) by the technology for satisfying requirements selected for 5G services, among requirements of a maximum terminal transmission rate of 20 Gbps, a maximum terminal speed of 500 km/h, a maximum delay time of 0.5 ms, and a terminal access density of 1,000,000 UEs/km².

For example, in order to provide eMBB in 5G, a maximum transmission speed of the terminal corresponding to 20 Gbps may be provided in downlink and a maximum transmission speed of the terminal corresponding to 10 Gbps may be provided in uplink from the viewpoint of one base station. Also, the average transmission rate of the terminal that is actually experienced should be increased. In order to satisfy such requirements, improvement of transmission/reception technologies, including a further improved multi-input multi-output transmission technology, is needed.

Also, in order to support an application service such as the Internet of things (IoT), mMTC is considered in 5G. The mMTC has requirements of supporting access by massive numbers of terminals within a cell, improving coverage of the terminal, increasing effective battery lifetime, and reducing the costs of the terminal in order to efficiently support IoT. IoT connects various sensors and devices to provide a communication function, and thus should support a large number of terminals (for example, 1,000,000 terminals/km²) within a cell. Further, in the mMTC, the terminal is highly likely to be located in a shade area such as the basement of a building or an area that cannot be covered by the cell due to the characteristics of the service, and thus mMTC requires wider coverage than the coverage provided by eMBB. The mMTC is highly likely to be configured by cheap terminals, and it is difficult to frequently change a battery of the terminal, so a long battery life is needed.

Last, the URLLC is cellular-based wireless communication used for a particular purpose and corresponds to a service used for remote control of a robot or a machine device, industrial automation, unmanned aerial vehicles, remote health control, and emergency notification, and thus should provide ultra-low-latency and ultra-reliable communication. For example, the URLLC should meet a maximum delay time shorter than 0.5 ms and also has requirements to provide a packet error rate equal to or lower than $10^{-5}$. Therefore, for the URLLC, a transmit time interval (TTI) shorter than that of a 5G service such as eMBB should be provided, and moreover, it is required to perform design so as to allocate wide resources in a frequency band.

The services under consideration for adoption in the $5^{th}$-generation wireless cellular communication system should be provided as a single framework. That is, in order to efficiently manage and control resources, it is preferable to perform control and transmission such that the services are integrated into one system rather than to independently operate the services.

Figure 2:
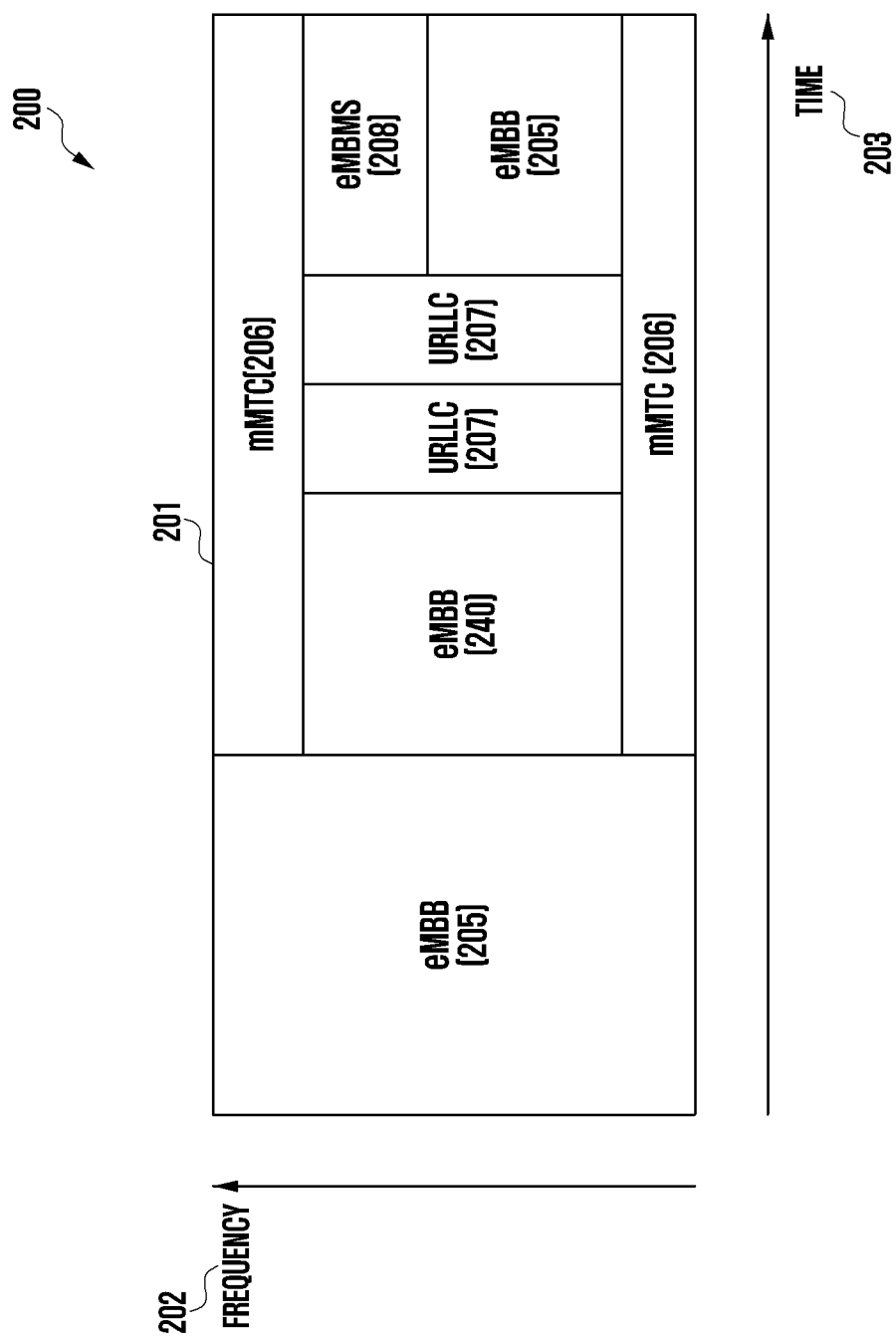
FIG. 2 illustrates an example in which 5G services are multiplexed in one system.

FIG. 2 illustrates an example in which services under consideration by 5G are transmitted through one system.

In FIG. 2, frequency-time resources 201 used in 5G may include a frequency axis 202 and a time axis 203. FIG. 2 illustrates an example in which 5G operates eMBB 205, mMTC 206, and URLLC 207 within one framework. Further, as a service which is additionally under consideration for implementation in 5G, an enhanced mobile broadcast/multicast service (eMBMS) 208 for providing a cellular-based broadcast service may be considered. The services under consideration for 5G, such as the eMBB 205, the mMTC 206, the URLLC 207, and the eMBMS 208, may be multiplexed through time-division multiplexing (TDM) or frequency-division multiplexing (FDM) within one system frequency bandwidth operated by 5G, and spatial-division multiplexing may be also considered. In the case of the eMBB 205, it is preferable to occupy and transmit as many frequency bandwidths as possible for a particular time in order to provide the increased data transmission rate. Accordingly, it is preferable that the service of the eMBB 205 be time-division-multiplexed (TDM) with another service within the system transmission bandwidth 201, but it is also preferable that the service of the eMBB 205 be frequency-division-multiplexed with other services within the system transmission bandwidth according to the need of the other services.

Unlike other services, the mMTC 206 requires an increased transmission interval in order to secure wider coverage, and may secure the coverage by repeatedly transmitting the same packet within the transmission interval. In order to simultaneously reduce the terminal complexity and the terminal price, the transmission bandwidth within which the terminal is capable of performing reception is limited. When the requirements described above are considered, it is preferable that the mMTC 206 be frequency-division-multiplexed with other services within the transmission system bandwidth 201.

It is preferable that the URLLC 207 have a shorter transmit time interval (TTI) compared to other services in order to meet the ultra-low-latency requirements of the service. Also, in order to meet the ultra-reliability requirement, a low coding rate is needed, so that it is preferable to occupy a wide frequency bandwidth. When the requirements of URLLC 207 are considered, it is preferable that the URLLC 207 be time-division-multiplexed with other services within the transmission system bandwidth 201 of 5G.

The above-described services may have different transmission/reception schemes and transmission/reception parameters in order to meet the requirements of the services. For example, the services may have different numerologies depending on the requirements thereof. A numerology includes a cyclic prefix (CP) length, subcarrier spacing, an OFDM symbol length, and a transmission time interval (TTI) in an orthogonal frequency-division multiplexing (OFDM) or orthogonal frequency-division multiple access (OFDMA)-based communication system. In an example in which the services have different numerologies, the eMBMS 208 may have a longer CP than other services. Since the eMBMS transmits higher traffic based on broadcasting, the same data may be transmitted in all cells. At this time, if signals received by a plurality of cells reach the CP length, the terminal may receive and decode all of the signals and thus obtain a single frequency network (SFN) diversity gain, and accordingly, even a terminal located at a cell boundary can receive broadcasting information without any coverage restriction. However, if the CP length is relatively longer than other services, waste occurs due to CP overhead in order to support the eMBMS in 5G, and thus a longer OFDM symbol is required than in the case of other services, which results in narrower subcarrier spacing compared to other services.

Further, as an example in which different numerologies are used for services in 5G, a shorter OFDM symbol may be required as a shorter TTI is needed compared to other services, and moreover, wider subcarrier spacing may be required in the case of URLLC.

Meanwhile, even when services and technologies for 5G phase 2 or beyond-5G are multiplexed to the 5G operation frequency in the future, there are requirements to provide technologies and service of 5G phase 2 or beyond-5G so that no backward-compatibility problem occurs in operation of previous 5G technologies. The requirement is referred to as "forward compatibility", and techniques for satisfying forward compatibility should be considered when 5G is initially designed. In the initial LTE standardization step, consideration of forward compatibility was inadequate, and thus there may be a limitation on providing a new service within an LTE framework. For example, in the case of enhanced machine-type communication (eMTC) applied to LTE release-13, the terminal is able to communicate only at a frequency of 1.4 MHz regardless of the system bandwidth provided by the serving cell in order to reduce the cost of the terminal through reduction in complexity of the terminal. Meanwhile, since the terminal supporting eMTC cannot receive a physical downlink control channel (PDCCH) transmitted in the entire band of the conventional system transmission bandwidth, there is a limitation in that a signal cannot be received in a time interval in which the PDCCH is transmitted. Accordingly, the 5G communication system should be designed to efficiently coexist with services considered after the 5G communication system. For forward compatibility of the 5G communication system, resources should be freely allocated and transmitted so that services considered in the future can be freely transmitted in a time-frequency resource region supported by the 5G communication system. In order to support forward compatibility in the 5G communication system, the 5G terminal is supported to receive indication of allocation of reserved resources through at least a higher-layer signal.

One TTI may be defined as one slot and may consist of 14 OFDM symbols or 7 OFDM symbols in 5G. Accordingly, in the case of subcarrier spacing of 15 kHz, one slot has a length of 1 ms or 0.5 ms. Further, one TTI may be defined as one mini-slot or sub-slot for emergency transmission and transmission in an unlicensed band in 5G, and one mini-slot may have OFDM symbols ranging from 1 to (the number of OFDM symbols of the slot)−1. If the length of one slot corresponds to 14 OFDM symbols, the length of the mini-slot may be determined as one of 1 to 13 OFDM symbols. Alternatively, instead of a separate definition of the term "slot" or "mini-slot", one TTI may be defined only by the slot. Accordingly, one slot may be differently configured for each terminal, and one slot may have OFDM symbols ranging from 1 to "the number of OFDM symbols of the slot". The length of the slot or the mini-slot may be defined according to a standard, and may be transmitted through a higher-layer signal or system information and received by the terminal. The slot or the mini-slot may be defined to have various transmission formats, and may be classified into the following formats.

DL only slot or full DL slot: includes only downlink sections and supports only downlink transmission.

L-centric slot: includes downlink sections, GP, and uplink sections, and has a larger number of OFDM symbols in the downlink section than in the uplink section.

UL-centric slot: includes downlink sections, GP, and uplink sections, and has a smaller number of OFDM symbols in the downlink section than in the uplink section.

UL-only slot or full-DL slot: includes only uplink sections and supports only uplink transmission.

In the above description, only the slot formats are divided, but the mini-slot may be also classified in the same way. That is, the mini slot may be classified into a DL-only mini slot, a DL-centric mini slot, a UL-centric mini slot, and a UL-only mini slot.

The transmission interval (or a transmission start symbol and a transmission end symbol) of uplink transmission may vary depending on the format of the slot or the mini-slot. Even when reserved resources are configured in one slot, the transmission interval of uplink transmission may be changed. Further, the case in which an uplink control channel having a short transmission interval (hereinafter, referred to as a short PUCCH in the disclosure) to minimize a transmission delay and an uplink control channel having a long transmission interval (hereinafter, referred to as a long PUCCH in the disclosure) to acquire sufficient cell coverage coexist in one slot or a plurality of slots and the case in which the uplink control channel is multiplexed in one slot or a plurality of slots, such as transmission of an uplink sounding signal like an SRS, should be considered. Accordingly, when the transmission interval of uplink transmission, such as an uplink data channel, an uplink control channel, or an uplink sounding reference signal, varies in units of OFDM symbols, a method of controlling the power of the uplink transmission within a maximum transmission power value of the terminal is needed in order to maintain the uplink coverage. In order to satisfy the reliability of uplink transmission in a service having ultra reliability as a requirement thereof, a method of controlling the power of the uplink transmission within the maximum transmission power value of the terminal is needed.

The disclosure provides a method of controlling the power of the uplink transmission within the maximum transmission power value of the terminal in consideration of the number of OFDM symbols or reliability in order to maintain the uplink coverage of the uplink transmission and to satisfy the reliability of the uplink transmission in the slot or the mini-slot of the base station and the terminal.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

Further, although the following detailed description of embodiments of the disclosure will be directed to LTE and 5G systems, it can be understood by those skilled in the art that the main gist of the disclosure may also be applied to any other communication system having similar technical backgrounds and channel formats, with a slight modification, without substantially departing from the scope of the disclosure.

Hereinafter, the 5G system for transmitting and receiving data in the 5G cell will be described.

Figure 3:
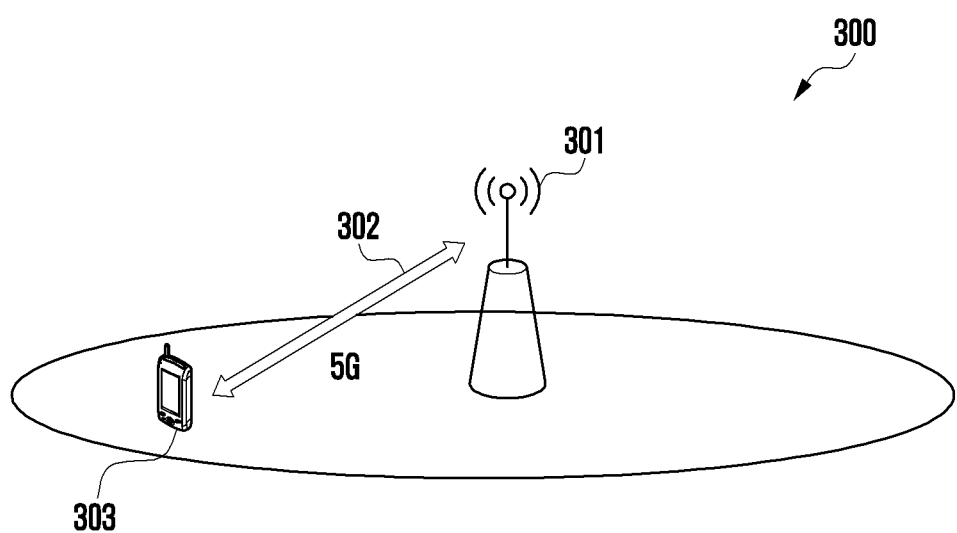
FIG. 3 illustrates an embodiment of a communication system to which the disclosure is applied.

FIG. 3 illustrates an embodiment of a communication system to which the disclosure is applied. The drawings illustrate the form in which the 5G system is operated, and the schemes proposed by the disclosure can be applied to the system of FIG. 3.

Referring to FIG. 3, the case in which a 5G cell 302 is operated by one base station 301 in a network is shown. A terminal 303 is a 5G-capable terminal having a 5G transmission/reception module. The terminal 303 acquires synchronization through a synchronization signal transmitted in the 5G cell 302, receives system information, and then transmits and receives data to and from the base station 301 through the 5G cell 302. In this case, there is no limitation as to the duplexing method of the 5G cell 302. If the 5G cell is a P cell, uplink control transmission is performed through the 5G cell 302. In the 5c system, the 5G cell may have a plurality of serving cells, and may support a total of 32 serving cells. It is assumed that the BS 301 includes a 5G transmission/reception module (system) in the network and can manage and operate the 5G system in real time.

Figure 4:
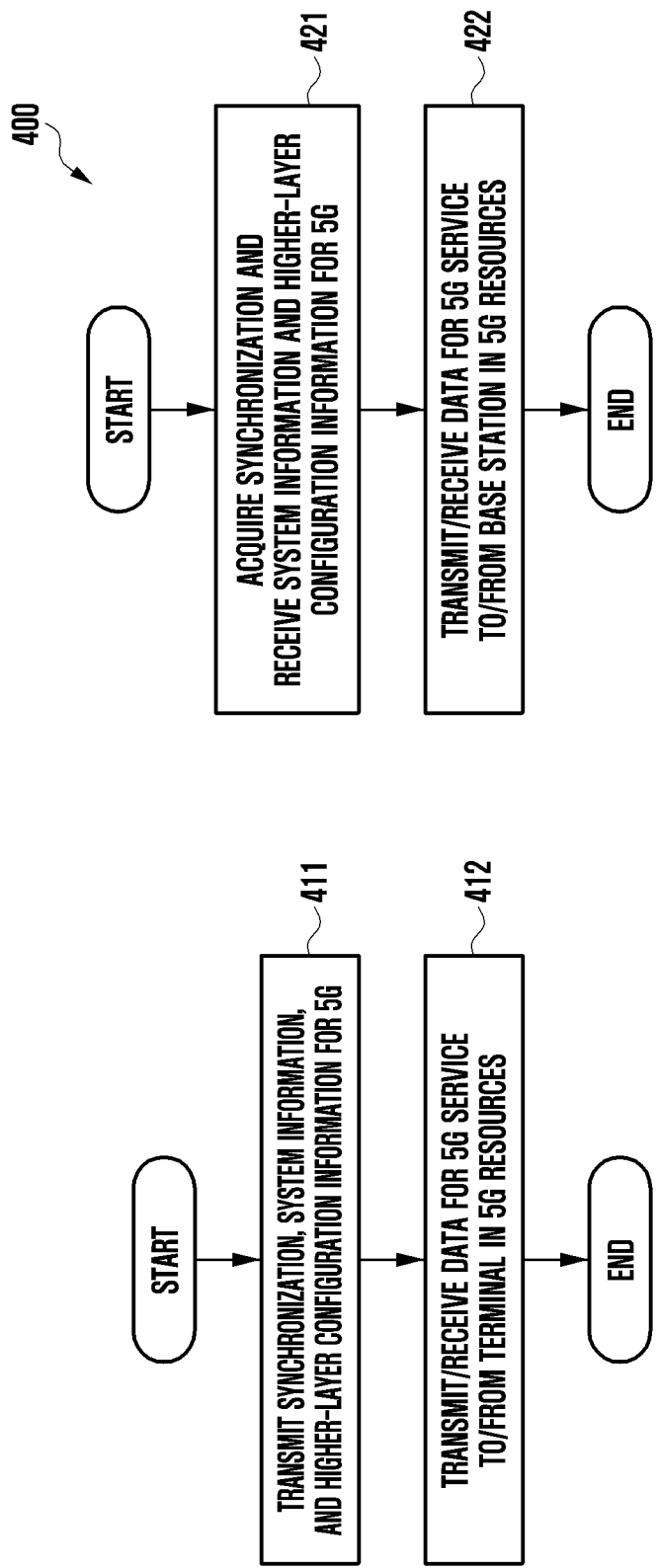
FIG. 4 illustrates the operation of a terminal and a base station operating in a communication system to which a proposed embodiment is applied.

Subsequently, a procedure in which the base station 301 configures 5G resources and transmits and receives data to and from the 5G-capable terminal 303 in resources for 5G will be described with reference to FIG. 4.

In step 411, the base station 301 transmits synchronization for 5G, system information, and higher-layer configuration information to the 5G-capable terminal 303. With respect to the synchronization signal for 5G, separate synchronization signals may be transmitted for eMBB, mMTC, and URCCL using different numerologies, and a common synchronization signal may be transmitted through specific 5G resources using one numerology. With respect to the system information, common system information may be transmitted through specific 5G resources using one numerology, and separate system information may be transmitted for eMBB, mMTC, and URLLC using different numerologies. The system information and the higher configuration information may include configuration information indicating whether to use the slot or the mini-slot for data transmission and reception, the number of OFDM symbols of the slot or the mini-slot, and the numerology therefor. Further, when reception of a downlink common control channel is configured in the UE, the system information and the higher configuration information may include configuration information related to the reception of the downlink common control channel. When the terminal controls the power of uplink transmission, configuration information related to power control may be included.

In step 412, the base station 301 transmits and receives data for the 5G service to and from the 5G-capable terminal 303 through 5G resources.

When transmitting and receiving data to and from the terminal, the base station may transmit a downlink control channel required for scheduling the data and insert a command required by the terminal for controlling uplink transmission into the downlink control channel.

Subsequently, the procedure in which the 5G-capable terminal 303 receives the configuration of 5G resources from the base station 301 and transmits and receives data through the 5G resources will be described.

In step 421, the 5G-capable terminal 303 acquires synchronization from the synchronization signal for 5G transmitted by the base station 301 and receives the system information and the higher configuration information transmitted by the base station 301. With respect to the synchronization signal for 5G, separate synchronization signals may be transmitted for eMBB, mMTC, and URCCL using different numerologies, and a common synchronization signal may be transmitted through specific 5G resources using one numerology. With respect to the system information, common system information may be transmitted through specific 5G resources using one numerology, and separate system information may be transmitted for eMBB, mMTC, and URLLC using different numerologies. The system information and the higher configuration information may include configuration information indicating whether to use the slot or the mini-slot for data transmission and reception, the number of OFDM symbols of the slot or the mini-slot, and the numerology therefor. Further, if reception of a downlink common control channel is configured in the terminal, the system information and the higher configuration information may include configuration information related to reception of the downlink common control channel. When the terminal controls the power of uplink transmission, configuration information related to power control may be included.

In step 422, the 5G-capable terminal 303 transmits and receives data for the 5G service to and from the base station 301 through 5G resources. When transmitting and receiving data to and from the base station, the terminal may receive a downlink control channel including scheduling information of the data, attempt decoding, and insert a command, required by the terminal for controlling uplink power, into the downlink control channel.

Figure 5:
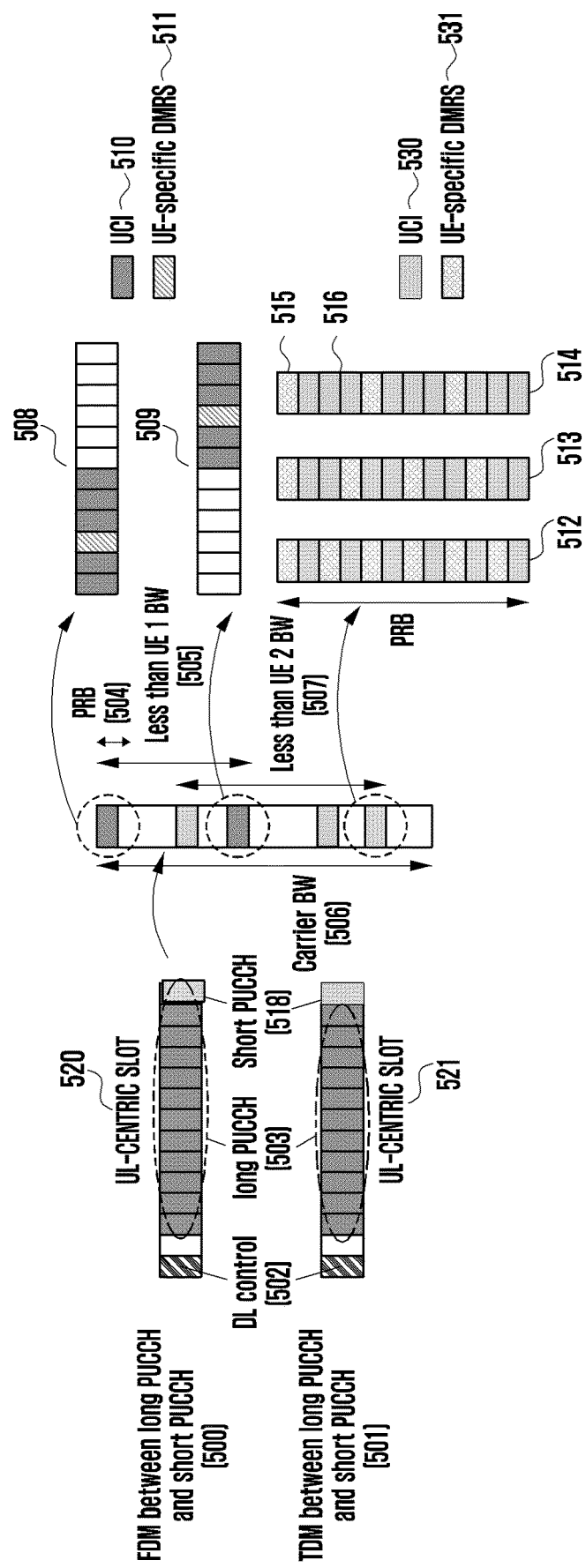
FIG. 5 illustrates physical uplink control channel (PUCCH) transmission in the 5G system.

FIG. 5 illustrates PUCCH transmission in the 5G system.

FIG. 5 shows multiplexing of the long PUCCH and the short PUCCH in the frequency region (FDM 500) and multiplexing of the long PUCCH and the short PUCCH in the time region (TDM 501). Referring to FIG. 5, the long PUCCH and the short PUCCH are transmitted over various OFDM symbols in one slot. First, the structure of the slot in which the long PUCCH and the short PUCCH are multiplexed will be described with reference to FIG. 5. Reference numerals 520 and 521 indicate UL-centric slots in which uplink is mainly used in the slot, which is a basic transmission unit of 5G (various names such as "subframe" or "transmission time interval (TTI)" may be used, but "slot", which is a basic transmission unit, is used in the disclosure). In the UL-centric slot, most OFDM symbols are used for uplink, and all OFDM symbols may be used for uplink transmission, or leading OFDM symbols may be used for downlink transmission. If both the downlink and the uplink exist in one slot, there may be a transmission gap therebetween. In FIG. 5, a first OFDM symbol in one slot may be used for downlink transmission, for example, downlink control channel transmission 502, and symbols from a third OFDM symbol may be used for uplink transmission. A second OFDM symbol is used for the transmission gap. In uplink transmission, uplink data channel transmission and uplink control channel transmission can be performed.

Subsequently, a long PUCCH 503 will be described. A control channel of a long transmission interval is used to increase cell coverage, and thus may be transmitted through a DFT-S-OFDM scheme for short carrier transmission rather than OFDM transmission. Accordingly, at this time, only consecutive subcarriers should be transmitted, and uplink control channels of the long transmission interval are configured at separated locations as indicated by reference numerals 508 and 509 in order to acquire a frequency diversity effect. The number of OFDM symbols supported for long PUCCH transmission in the time region is 4 to 14. A separated distance 505 in the frequency region should be smaller than the bandwidth supported by the terminal, and transmission is performed using PRB-1 in the front part of the slot as indicated by reference numeral 508 and transmission is performed using PRB-2 in the back part of the slot as indicated by reference numeral 509. The PRB is a physical resource block, may be the minimum transmission unit in the frequency region, and may be defined by 12 subcarriers. Accordingly, the frequency distance between PRB-1 and PRB-2 should be smaller than the maximum bandwidth supported by the terminal, and the maximum bandwidth supported by the terminal may be equal to or smaller than the bandwidth 506 supported by the system. Frequency resources PRB-1 and PRB-2 may be configured in the terminal through a higher-layer signal and frequency resources may be mapped to a bit field through a higher-layer signal. The frequency resources to be used may be indicated to the terminal through the bit field included in the downlink control channel. Each of the control channel transmitted in the front part of the slot 508 and the control channel transmitted in the back part of the slot 509 may include uplink control information (UCI) 510 and a terminal reference signal 511, and it is assumed that the two signals are transmitted in different OFDM symbols in a time-division manner.

Subsequently, a short PUCCH 518 will be described. The short PUCCH may be transmitted through both the DL-centric slot and the UL-centric slot, and may generally be transmitted through the last symbol of the slot or an OFDM symbol in the back part (for example, the last OFDM symbol, the second-to-last OFDM symbol, or the last two OFDM symbols). Of course, the short PUCCH can be transmitted at a random location within the slot. The short PUCCH may be transmitted using one OFDM symbol or a plurality of OFDM symbols. In FIG. 5, the short PUCCH is transmitted in the last symbol 518 of the slot. Radio resources for the short PUCCH may be allocated in units of PRBs from the aspect of frequency, and a plurality of consecutive PRBs may be allocated, or a plurality of PRBs separated from each other in the frequency band may be allocated. The allocated PRBs should be included in a band equal to or smaller than the frequency band 507 supported by the terminal. The plurality of PRBs, which are the allocated frequency resources, may be configured in the terminal through a higher-layer signal, the frequency resources may be mapped to a bit field through the higher-layer signal, and the frequency resources to be used may be indicated to the terminal by the bit field included in the downlink control channel. Uplink control information 530 and a demodulation reference signal 531 should be multiplexed within one PRB in the frequency band, and there may be a method of transmitting a demodulation reference signal to one subcarrier for every two symbols, as indicated by reference numeral 512, a method of transmitting a demodulation reference signal to one subcarrier for every three symbols, as indicated by reference numeral 513, or a method of transmitting a demodulation reference signal to one subcarrier for every four symbols, as indicated by reference numeral 514.

Examples in which PUCCH transmission is performed in various OFDM symbols have been described with reference to FIG. 5.

Next, an example in which transmission of the PUSCH and the SRS or the PUCCH is performed in various OFDM symbols will be described with reference to FIG. 6.

Figure 6:
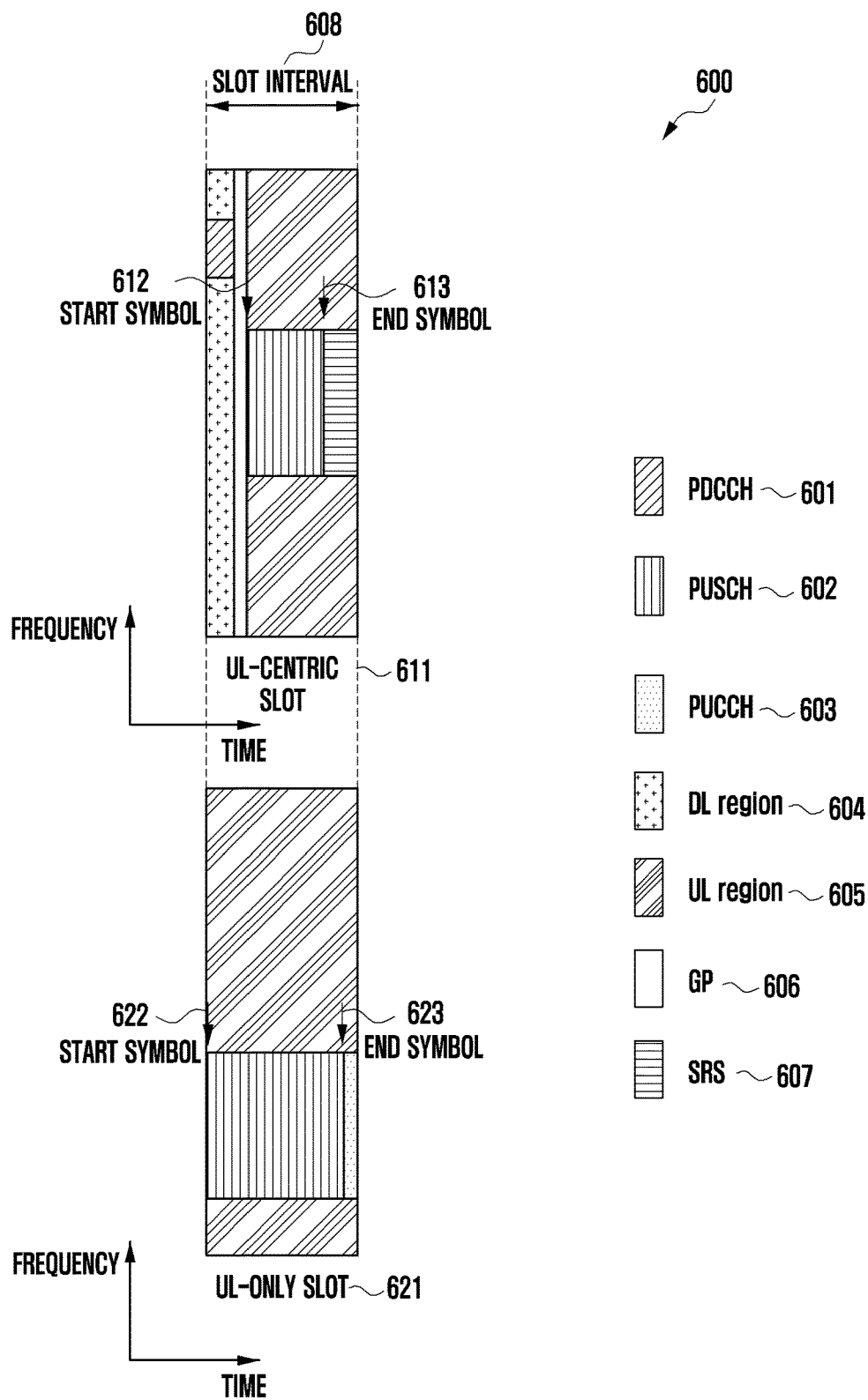
FIG. 6 illustrates uplink transmission such as PUCCH, sounding reference signal (SRS), and physical uplink shared channel (PUSCH) transmission in the 5G system.

In FIG. 6, reference numeral 601 indicates a downlink control channel, which may be a terminal-common control channel or a terminal-specific control channel. The terminal-common control channel includes information that can be indicated to terminals in common, such as information about the construction of the slot or the mini-slot. The terminal-specific control channel includes terminal-specific information such as data transmission frequency location information for uplink data scheduling.

In FIG. 6, reference numeral 603 indicates an uplink data channel, and the data channel includes uplink data and an RS required for transmission of the uplink data.

In FIG. 6, reference numeral 603 indicates an uplink control channel, and the control channel includes uplink control information and an RS required for transmission and reception of the uplink control information.

In FIG. 6, reference numeral 604 indicates time and frequency regions in which downlink transmission can be performed in one slot.

In FIG. 6, reference numeral 605 indicates time and frequency regions in which uplink transmission can be performed in one slot.

In FIG. 6, reference numeral 606 indicates time and frequency regions required for an RF change from downlink to uplink in one slot.

In FIG. 6, reference numeral 607 indicates an uplink sounding reference signal.

First, in a UL-centric slot 611 of one slot interval 608, a transmission OFDM symbol internal of uplink data may vary in units of OFDM symbols according to a start OFDM symbol and an end OFDM symbol (or an interval length) of uplink data. Time and frequency regions in which the downlink control channel 601, the uplink data channel 602, and the uplink sounding reference signal 607 are transmitted are illustrated in the UL-centric slot 611 of FIG. 6. The uplink data channel 602 may start transmission in an uplink region 605, and the base station should inform the terminal of the slot within which the uplink sounding reference signal is transmitted in the uplink region 605 and of the OFDM symbol, in which the uplink sounding reference signal is transmitted, in order to avoid a transmission collision with the sounding reference signal 607 of other terminals. As a result, the transmission OFDM symbol interval of the uplink data 602 may be transmitted in only some OFDM symbols within the uplink region 605.

Next, the situation in which the transmission OFDM symbol internal of uplink data varies in the UL-only slot 621 of one slot interval 608 will be described. The time and frequency regions in which the uplink data channel 602 and the uplink control channel 603 are transmitted in the UL-only slot 621 of FIG. 6 are illustrated. The uplink data channel 602 may start transmission from the first OFDM symbol of the uplink region 605, and the time and frequency regions of the uplink control channel 603 of other terminals cannot be known. Accordingly, in order to avoid a collision of time and frequency regions of the uplink control channel 603 with other terminals, the base station should inform one terminal of the OFDM symbols within the uplink region 605 in one slot in which the terminal can transmit the uplink data channel 602.

As described in FIG. 6, due to the time and frequency regions in which the PUSCH, the PUCCH, and the sounding reference signal (SRS) of the terminals are transmitted, the number of transmission OFDM symbols of the uplink data channel, the uplink control channel, and the uplink sounding reference signals may vary.

As described with reference to FIGS. 5 and 6, if the uplink transmission interval varies in units of OFDM symbols, a method of controlling the power of uplink transmission on the basis of the number of transmission OFDM symbols will be described. A method of controlling the power of uplink transmission to satisfy the reliability required for uplink transmission of a service such as URLLC, having ultra reliability as a requirement thereof, will be additionally described.

First, controlling the power of uplink transmission in NR, as proposed by the disclosure, is described. Particularly, each of power control methods used for the PUCCH, the PUSCH, and the SRS is described on the basis of [Equation 1], [Equation 2], and [Equation 3]. Hereinafter, controlling the transmission power of the PUCCH is mainly described, but embodiments of the disclosure can be applied to transmission power of the PUSCH or the SRS without any limitation.

In the NR system, the terminal transmits the PUCCH, the PUSCH, and the SRS by controlling the transmission power of uplink transmission. The terminal may control transmission power of uplink control information of the PUCCH to a value calculated using [Equation 1] below.

$$P_{PUCCH}(i) = \min\{P_{CMAX,c}(i), q_1(i)\} [dBm]$$

where $$q_1(i) = P_{O\_PUCCH} + PL_c + h(n_{CQI}, n_{HARQ}, n_{SR}) + 10 \log_{10}(M_{PUCCH,c}(i)) + \Delta_{F\_PUCCH}(F) + \Delta_{TxD}(F) + g(i) \quad \text{[Equation 1]}$$

The terminal may control transmission power of uplink data information of the PUSCH to a value calculated using [Equation 2] below.

$$P_{PUSCH,c}(i) = \min\{P_{CMAX,c}(i), q_2(i)\} [dBm]$$

where, $$q_2(i) = P_{O\_PUSCH,c}(j) + \alpha_c(j) * PL_c + 10 \log_{10}(M_{PUSCH,c}(i)) + \Delta_{TF,c}(i) + f_c(i) \quad \text{[Equation 2]}$$

The terminal may control transmission power of the uplink sounding reference signal of the SRS to a value calculated using [Equation 3] below.

$$P_{SRS,c}(i) = \min\{P_{CMAX,c}(i), q_3(i)\} [dBm]$$

where, $$q_3(i) = P_{SRS\_OFFSET,c}(m) + 10 \log_{10}(M_{SRS,c}) + P_{O\_PUSCH,c}(j) + \alpha_c(j) * PL_c + f_c(i) \quad \text{[Equation 3]}$$

In [Equation 1], i denotes an index of the slot, $P_{CMAX,c}(i)$ denotes the maximum transmission power of the terminal in one slot, $P_{O\_PUCCH}$ denotes the sum of an initially set terminal-related value and an initially set cell-related value configured by the base station, and $PL_c$ denotes a value for compensating for path loss between the base station and the terminal. Further, in [Equation 1], $h(n_{CQI}, n_{HARQ}, n_{SR})$ and $\Delta_{F\_PUCCH}(F)$ denote a format for uplink control information, that is, a PUCCH format and a factor configured differently according to the amount of uplink control information. $\Delta_{F\_PUCCH}(F)$ is indicated to the terminal by the base station through higher-layer signaling and is configured as a value in sets of a plurality of integer values according to each format for uplink control information. Moreover, $h(n_{CQI}, n_{HARQ}, n_{SR})$ and $\Delta_{F\_PUCCH}(F)$ are complementary to each other, and if transmission power set as $h(n_{CQI}, n_{HARQ}, n_{SR})$ is excessive or insufficient, $h(n_{CQI}, n_{HARQ}, n_{SR})$ may be compensated for by $\Delta_{F\_PUCCH}(F)$. At this time, on the basis of a PUCCH format requiring the smallest power value, $\Delta_{F\_PUCCH}(F)$ sets a relative power value required for another PUCCH format. That is, if it is assumed that PUCCH format A, PUCCH format B, and PUCCH format C are defined for the long PUCCH format in NR, an absolute power value of PUCCH format A is first determined as 0 dB, and then a relative power value, required according to a format for another piece of uplink control information or the amount and type of the uplink control information, is assigned. If a signal-to-noise ratio (SNR) required for acquiring an error probability of 1% is −6 dB when PUCCH format A is used and an SNR required for acquiring an error probability of 1% is 1 dB when PUCCH format B is used, $\Delta_{F\_PUCCH}(F)$ sets 0 dB for PUCCH format A and 7 dB for PUCCH format B. At this time, the original value of −6 dB, required for acquiring the error probability of 1% in PUCCH format A, is reflected in PO_PUCCH.

$h(n_{CQI}, n_{HARQ}, n_{SR})$ is an equation for differently controlling power on the basis of the number of input bits according to the format for uplink control information, that is, each of various PUCCH formats in the NR system.

$M_{PUCCH,c(i)}$ is an equation for reflecting the amount of transmission frequency resources set for PUCCH transmission.

g(i) is a power value of slot i when a value (δ) transmitted to be dynamically changed by the PDCCH which can be transmitted in every slot is applied, and g(i) of slot i may be configured by accumulating the δ value in g(i−1), which is g(i) of the previous slot, or may be configured as an absolute value by ignoring the value of the previous slot and applying only a value indicated by the corresponding slot.

q1(i) for controlling power transmission of the short PUCCH or the long PUCCH can be configured by summing at least one of the above-described equations, and q1(i) is an equation that should be basically considered for controlling the uplink power of the PUCCH.

In [Equation 2], i denotes an index of the slot, $P_{CMAX,c}(i)$ denotes the maximum transmission power of the terminal in one slot, $P_{O\_PUCCH,c}(j)$ denotes the sum of an initially set terminal-related value and an initially set cell-related value configured by the base station, and $\alpha_c(j) * PL_c$ denotes a value for compensating for path loss between the base station and the terminal. $M_{PUSCH,c}(i)$ is to contain the amount of transmission frequency resources scheduled for PUSCH transmission. ΔTF,c(i) is to contain a modulation scheme and a coding rate of the MCS, and $f_c(i)$ is a power value of slot i when a value (δ) transmitted to be dynamically changed by the PDCCH which can be transmitted in every slot. $f_c(i)$ of slot i may be configured by accumulating the δ value in $f_c(i-1)$, which is $f_c(i)$ of the previous slot, or may be configured as an absolute value by ignoring the value of the previous slot and applying only the value indicated by the corresponding slot.

In [Equation 3], i denotes the index of the slot, $P_{CMAX,c}(i)$ denotes the maximum transmission power of the terminal in one slot, $P_{SRS\_OFFSEF,c}$ and $P_{O\_PUCCH,c}(j)$ denote the sum of an initially set terminal-related value and an initially set cell-related value configured by the base station, and $\alpha_c(j) * PL_c$ denotes a value for compensating for path loss between the base station and the terminal. $M_{SRS,c}$ is to contain the amount of transmission frequency resources set for SRS transmission. $f_c(i)$ is a power value of slot i when a value (δ) transmitted to be dynamically changed by the PDCCH which can be transmitted in every slot is applied, and $f_c(i)$ of slot i may be configured by accumulating the δ value in $f_c(i-1)$, which is $f_c(i)$ of the previous slot, or may be configured as an absolute value by ignoring the value of the previous slot and applying only the value indicated by the corresponding slot.

Next, a method of controlling power according to the number of transmission symbols of the PUCCH, the PUSCH, and the SRS will be described. In a first embodiment, an equation of $h(n_{symbol})$, having the number of transmission symbols as the input, is added to $q_1(i)$, $q_2(i)$, $q_3(i)$ in order to control power according to the number of transmission symbols of the PUCCH, the PUSCH, and the SRS. In order to determine the power value according to $h(n_{symbol})$, not only the equation but also the transmission power value according to the number of transmission OFDM symbols of the PUCCH, the PUSCH, and the SRS can be defined as a table.

In a second embodiment, coefficients w1, w2, and w3 according to the number of transmission symbols are multiplied by $t_1(i)$, $t_2(i)$, and $t_3(i)$ corresponding to linear values obtained through conversion of $q_1(i)$, $q_2(i)$, and $q_3(i)$ in order to control power according to the number of transmission symbols of the PUCCH, the PUSCH, and the SRS in $q_1(i)$, $q_2(i)$, and $q_3(i)$.

If it is assumed that the power values considering transmission of the PUCCH, the PUSCH, and the SRS in all OFDM symbols in one slot are $q_1(i)$, $q_2(i)$, and $q_3(i)$, respectively, power values in 1 OFDM symbol may be a value obtained by dividing $q_1(i)$, $q_2(i)$, and $q_3(i)$ by the number of all OFDM symbols. Available examples of the first embodiment and the second embodiment are shown in [Table 2] and [Table 3], respectively. At this time, there is an advantage of keeping the change in transmission power in one slot to a minimum.

TABLE 2

| n_symbol | h(n_symbol) |
|---|---|
| 1 | A (=0) |
| 2 | B |
| 3 | C |
| ... | ... |
| 14 | D (=$P_{CMAX}$) |

TABLE 3

| n_symbol | w |
|---|---|
| 1 | A' (=1/14) |
| 2 | B' |
| 3 | C' |
| ... | ... |
| 14 | D' (=1) |

On the other hand, a method of increasing transmission power to maintain the transmission power in one slot even in transmission of the PUCCH, the PUSCH, and the SRS in 1 or 2 OFDM symbols may be considered in order to keep the uplink coverage according to transmission power in one slot. Available examples of the first embodiment and the second embodiment are shown in [Table 4] and [Table 5], respectively.

TABLE 4

| n_symbol | h(n_symbol) |
|---|---|
| 1 | A (=$P_{CMAX}$) |
| 2 | B |
| 3 | C |
| ... | ... |
| 14 | D (=0) |

TABLE 5

| n_symbol | w |
|---|---|
| 1 | A' (=1) |
| 2 | B' |
| 3 | C' |
| ... | ... |
| 14 | D' (=1/14) |

In a third embodiment, different values may be applied to δ, corresponding to a TPC command according to the number of transmission OFDM symbols of the PUCCH, the PUSCH, and the SRS. Instead of δ, k*δ, obtained by multiplying δ by the coefficient k, is applied according to a set of the numbers of PUCCH transmission OFDM symbols. For example, a different value of k may be applied to $7<n_{symbol}\leq14$ and $1<n_{symbol}\leq7$. Alternatively, different TPC commands may be applied according to the number of PUCCH transmission OFDM symbols, as shown in [Table 6]. For example, set A may be applied to $7<n_{symbol}\leq14$ and set B may be applied to $1<n_{symbol}\leq7$.

TABLE 6

| TPC command field in DCI | δ Set A [dB] | δ Set B [dB] |
|---|---|---|
| 0 | −1 | −1 |
| 1 | 0 | 0 |
| 2 | 1 | 2 |
| 3 | 3 | 6 |

Subsequently, a method of controlling power when PUCCH transmission of a service such as URLLC, having ultra reliability as a requirement thereof, is performed is described. The terminal may be aware of scheduling of URLLC data from the DCI size of a downlink control channel through which scheduling of a downlink data signal is received, setting of a specific field, or a separate RNTI for URLLC. Alternatively, the terminal may be aware of scheduling of URLLC data through configuration of a higher-layer signal for URLLC or configuration of a transmission mode for URLLC. Accordingly, the terminal may know that an uplink control channel for downlink data scheduled by the downlink control channel is transmitted. Alternatively, the terminal may know that URLLC uplink data transmission should be performed by mapping of a higher packet IP of the terminal or a port number or mapping of a specific logical channel ID. Alternatively, if the terminal is scheduled or configured to perform uplink transmission in specific uplink resources, the terminal may determine that the uplink is for URLLC. In a fourth embodiment, the terminal adds a field for applying a power value according to power boosting to a table in which a TPC command and δ, which is a power value to be applied, are defined. If a field according to the case in which power boosting is needed is added as shown in [Table 7] and the base station indicates application of the field, and if the terminal receives indication by the field, the field may be applied. A power increase value according to power boosting may be configured by a higher-layer signal, or may be defined as shown in the following table according to a standard.

TABLE 7

| TPC command field in DCI | δ[dB] |
|---|---|
| 0 | −1 |
| 1 | 0 |

TABLE 7-continued

| TPC command field in DCI | δ[dB] |
|---|---|
| 2 | 1 |
| 3 | "Power Boosting" |

Figure 7:
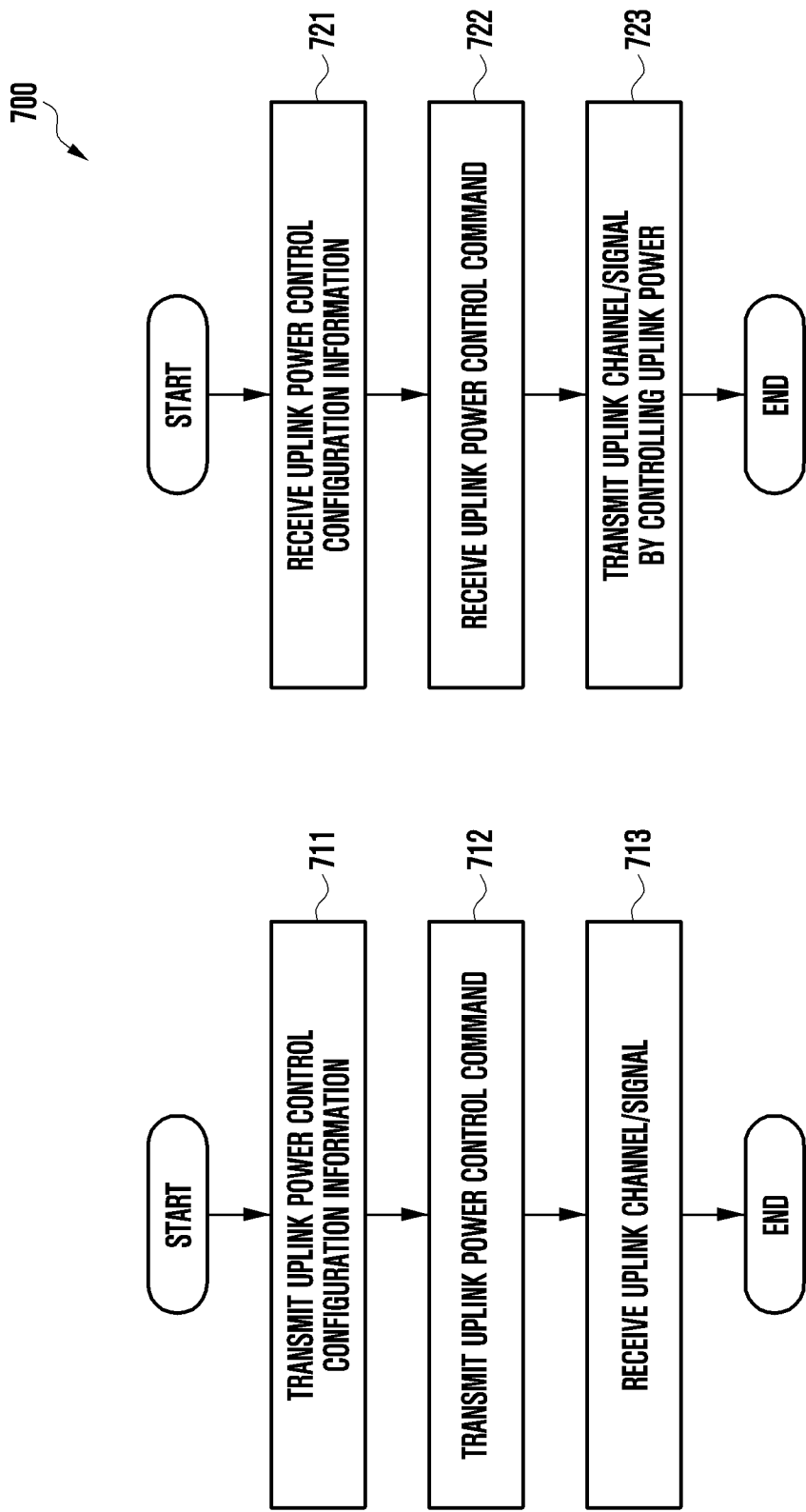
FIG. 7 illustrates procedures of the base station and the terminal according to embodiments of the disclosure.

FIG. 7 illustrates procedures of the base station and the terminal according to embodiments of the disclosure.

First, the base station procedure will be described.

In step 711, the base station transmits uplink power control configuration information to the terminal. If the PUCCH, the PUSCH, and the SRS are transmitted in various OFDM symbol intervals or in order to satisfy reliability, the uplink power control configuration information includes information required to be configured through a higher-layer signal for power control, and may be transmitted to the terminal through the higher-layer signal.

In step 712, the base station transmits an uplink power control command to the terminal according to the disclosure. If the PUCCH, the PUSCH, and the SRS are transmitted in various OFDM symbol intervals as described in the embodiment of FIG. 6 or in order to satisfy reliability, the uplink power control command includes information required for controlling power and is transmitted to the terminal through a downlink control channel.

In step 713, the base station receives the uplink channel or the uplink signal, configured or indicated to control uplink power in step 711 or 712, from the terminal.

Next, the terminal procedure will be described.

In step 721, the terminal receives uplink power control configuration information from the base station. If the PUCCH, the PUSCH, and the SRS are transmitted in various OFDM symbol intervals or in order to satisfy reliability, the uplink power control configuration information includes information required to be configured through a higher-layer signal for power control, and may be received from the base station through the higher-layer signal.

In step 722, the terminal receives an uplink power control command from the base station according to the disclosure. If the PUCCH, the PUSCH, and the SRS are transmitted in various OFDM symbol intervals as described in the embodiment of FIG. 6 or in order to satisfy reliability, the uplink power control command includes information required for controlling power and is received from the base station through a downlink control channel.

In step 723, the terminal transmits the uplink channel or the uplink signal configured or indicated to control uplink power in step 711 or 712 to the base station.

Figure 8:
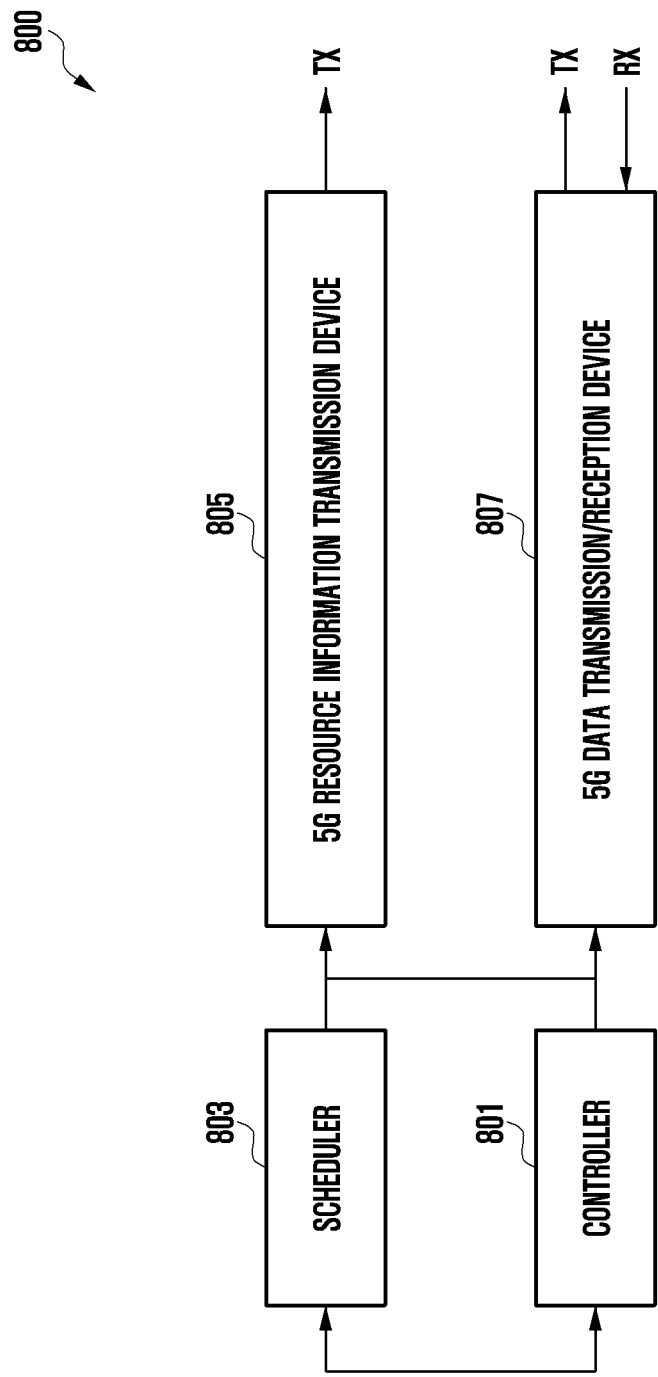
FIG. 8 illustrates a base station apparatus according to the disclosure.

Next, FIG. 8 illustrates a base station apparatus according to the disclosure.

A controller 801 controls transmission resources required for configuring uplink power control according to the base station procedure illustrated in FIG. 7 of the disclosure and the uplink power control method illustrated in FIG. 6 of the disclosure, performs transmission to the terminal through a 5G control information transmission device 805 and a 5G data transmission/reception device 807, schedules 5G data through a scheduler 803, and transmits/receives 5G data to/from the 5G terminal through the 5G data transmission/reception device 807.

Figure 9:
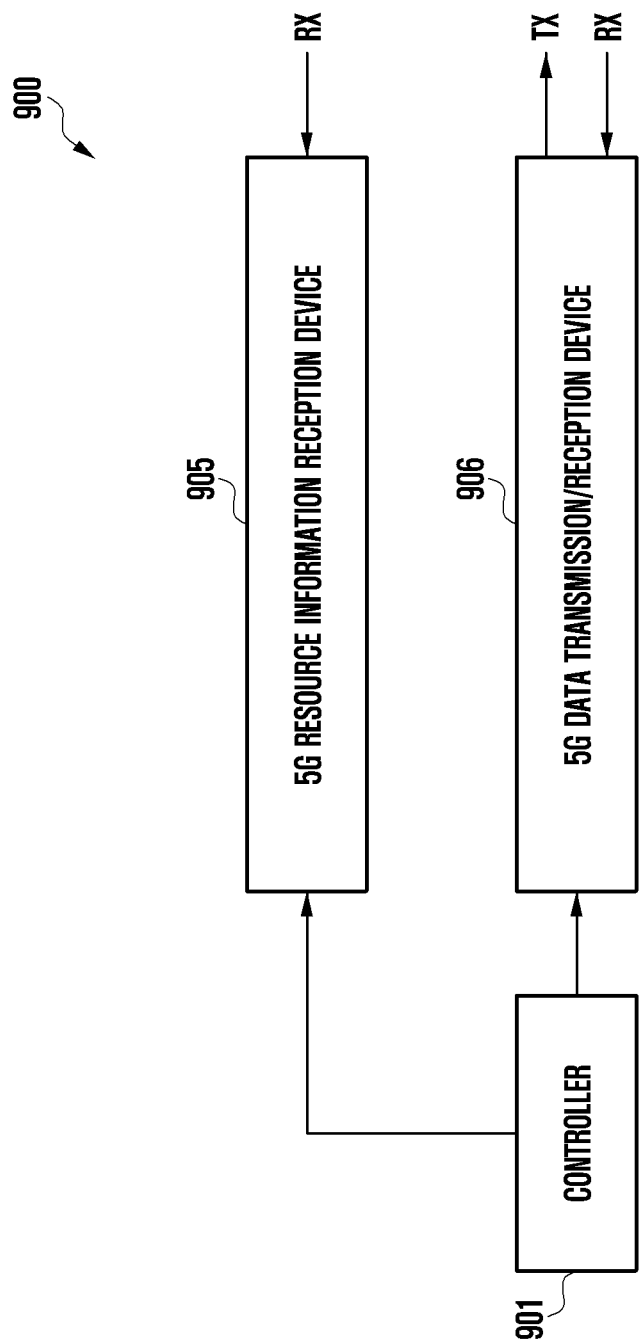
FIG. 9 illustrates a terminal apparatus according to the disclosure.

Next, FIG. 9 illustrates a terminal apparatus according to the disclosure.

A controller 901 receives information required for configuring uplink power control and a power control command from the base station through a 5G control information reception device 905 and a 5G data transmission/reception device 906 according to the terminal procedure illustrated in FIG. 7 of the disclosure and the uplink power control method illustrated in FIG. 6 of the disclosure, controls power for transmission of 5G data scheduled at the received resource location in the uplink through the 5G data transmission/reception device 906, and performs transmission/reception with the 5G base station.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

What is claimed:

1. A base station in a wireless communication system, the base station comprising:
   a transceiver configured to transmit or receive a signal; and
   a controller configured to:
   transmit, to a terminal, system information including information associated with an uplink subcarrier spacing, information associated with a number of physical uplink control channel (PUCCH) symbols, and information associated with an uplink power control for the PUCCH,
   transmit, to the terminal on a physical downlink control channel (PDCCH), a power control command for the PUCCH, and
   receive, from the terminal, the PUCCH based on the number of the PUCCH symbols and the uplink subcarrier spacing.

2. The base station of claim 1, wherein a power for the PUCCH depends on a function of a parameter on the information associated with the uplink power control for the PUCCH, a parameter on the number of the PUCCH symbols, and a parameter on the power control command for the PUCCH.

3. The base station of claim 1, wherein information associated with a frequency resource for the PUCCH is further transmitted to the terminal on the PDCCH, and
   wherein the frequency resource includes a physical resource block (PRB).

4. The base station of claim 1, wherein the system information further includes information associated with the PDCCH, and
   wherein the PDCCH is associated with a common control channel.

5. A method performed by a base station in a wireless communication system, the method comprising:
   transmitting, to a terminal, system information including information associated with an uplink subcarrier spacing, information associated with a number of physical uplink control channel (PUCCH) symbols, and information associated with an uplink power control for the PUCCH;
   transmitting, to the terminal on a physical downlink control channel (PDCCH), a power control command for the PUCCH; and
   receiving, from the terminal, the PUCCH based on the number of the PUCCH symbols and the uplink subcarrier spacing.

6. The method of claim 5, wherein a power for the PUCCH depends on a function of a parameter on the information associated with the uplink power control for the PUCCH, a parameter on the number of the PUCCH symbols, and a parameter on the power control command for the PUCCH.

7. The method of claim 5, wherein information associated with a frequency resource for the PUCCH is further transmitted to the terminal on the PDCCH, and
wherein the frequency resource includes a physical resource block (PRB).

8. The method of claim 5, wherein the system information further includes information associated with the PDCCH, and
wherein the PDCCH is associated with a common control channel.

9. A terminal in a wireless communication system, the terminal comprising:
a transceiver configured to transmit or receive a signal; and
a controller configured to:
receive, from a base station, system information including information associated with an uplink subcarrier spacing, information associated with a number of physical uplink control channel (PUCCH) symbols, and information associated with an uplink power control for the PUCCH,
receive, from the base station on a physical downlink control channel (PDCCH), a power control command for the PUCCH, and
transmit, to the base station, the PUCCH based on the uplink subcarrier spacing, by a power identified based on the number of the PUCCH symbols and the power control command for the PUCCH.

10. The terminal of claim 9, wherein the power is identified by a function of a parameter on the information associated with the uplink power control for the PUCCH, a parameter on the number of the PUCCH symbols, and a parameter on the power control command for the PUCCH.

11. The terminal of claim 9, wherein information associated with a frequency resource for the PUCCH is further received from the base station on the PDCCH, and
wherein the frequency resource includes a physical resource block (PRB).

12. The terminal of claim 9, wherein the system information further includes information associated with the PDCCH, and
wherein the PDCCH is associated with a common control channel.

13. A method performed by a terminal in a wireless communication system, the method comprising:
receiving, from a base station, system information including information associated with an uplink subcarrier spacing, information associated with a number of physical uplink control channel (PUCCH) symbols, and information associated with an uplink power control for the PUCCH;
receiving, from the base station on a physical downlink control channel (PDCCH), a power control command for the PUCCH; and
transmitting, to the base station, the PUCCH based on the uplink subcarrier spacing, by a power identified based on the number of the PUCCH symbols and the power control command for the PUCCH.

14. The method of claim 13, wherein the power is identified by a function of a parameter on the information associated with the uplink power control for the PUCCH, a parameter on the number of the PUCCH symbols, and a parameter on the power control command for the PUCCH.

15. The method of claim 13, wherein information associated with a frequency resource for the PUCCH is further received from the base station on the PDCCH, and
wherein the frequency resource includes a physical resource block (PRB).

16. The method of claim 13, wherein the system information further includes information associated with the PDCCH, and
wherein the PDCCH is associated with a common control channel.

* * * * *